INVENTOR
EUGENE H. WISE

BY *Martha L. Ross*

AGENT

United States Patent Office 3,788,928
Patented Jan. 29, 1974

3,788,928
METHOD OF FORMING A LAP JOINT BETWEEN TUBULAR ARTICLES OF THERMOPLASTIC MATERIAL
Eugene H. Wise, Newhall, Calif., assignor to R & G Sloane Manufacturing Company, Inc., Los Angeles, Calif.
Filed Mar. 26, 1971, Ser. No. 128,394
Int. Cl. B29c 19/00; C09j 5/00
U.S. Cl. 156—294                4 Claims

ABSTRACT OF THE DISCLOSURE

A method of forming a lap joint between tubular articles of thermoplastic material, wherein a reinforcing sleeve is positioned within the end portion of one of the articles that is to be disposed within a complementary end portion of the other of the articles, the reinforcing sleeve being formed of a material that has a melting point that is higher than that of the thermoplastic material of each of the articles. Thereafter, the end portions of the articles are heated, either before or after they are overlapped to form the lap joint, to melt the outer surface of the end portion of the one article and the inner surface of the end portion of the other article, thereby effecting the fusion welding of the end portions of the articles. The reinforcing sleeve serves to prevent the end portion of the one article from deforming when it is heated and inserted into the other article, or when it is heated while disposed within the end portion of the other article.

BACKGROUND OF THE INVENTION

This invention relates to a method of forming a lap joint between tubular articles of thermoplastic material and, more particularly, to such a method wherein a lap joint is formed between tubular articles of thermoplastic material by fusion welding.

Heretofore, two methods have been used rather extensively for forming fusion welded lap joints between tubular articles of thermoplastic material. In one of these methods, the end portions of the tubular articles to be joined are heated to melt the surfaces thereof that are to be disposed in overlapping relation. Thereafter, the heated end portions are disposed in overlapping relation to effect fusion welding of their overlapped melted surfaces, thereby forming a leak-proof lap joint between the tubular articles.

The second method has involved the overlapping of the end portions of the tubular articles to be joined and the subsequent heating of the lap joint therebetween to melt the overlapped surfaces of the end portions of the articles to effect fusion bonding therebetween. In some cases, a clamp or the like is utilized to apply external pressure to the overlapped surfaces during the heating thereof.

Problems have been encountered in using both of these methods for the joining of tubular articles of thermoplastic material, particularly with articles having relatively thin walls. In the use of the first method, wherein the articles are first heated and thereafter disposed in overlapping relation, there has been a tendency for the end portion of one of the articles to collapse or flow, owing to its heated condition, when it is inserted within the end portion of the other article and engages a stop surface thereof. The collapsing of the inner end portion in the lap joint has resulted in an obstruction of the passageway through the joined articles and diminished contact between the overlapped surfaces of the articles. Any obstruction to the flow through the passageway through the articles is obviously undesirable, as is any condition which results in reduced contact between the overlapped surfaces of the articles to be fusion welded. The contact between the overlapped surfaces is sometimes even further reduced by the tendency of the inner article end portion of the lap joint to shrink away from the other article as its plastic material cools after being heated. This condition may adversely affect the continuity or the strength of the fusion bond between the overlapped portions of the articles to be joined.

A need has arisen, therefore, for a simple and effective method of forming fusion-welded lap joints between tubular articles of thermoplastic material.

SUMMARY OF THE INVENTION

The method of the present invention fulfills the need for a simple and effective method of forming fusion-welded lap joints between tubular articles of thermoplastic material. In accordance with the present method, a reinforcing sleeve, formed of a material that has a melting point that is higher than that of the thermoplastic material of the tubular articles to be joined, is positioned within the end portion of one of the articles that is to be disposed within the end portion of the other article to form a lap joint therebetween. The reinforcing sleeve is positioned within the end portion of one article prior to the heating of the end portions of the articles, before the end portions are disposed in overlapping relation, to prevent the end portion of one article from shrinking away, flowing or otherwise deforming when it is heated and fusion-welded to the overlapped end portion of the other article. Thus, with respect to the first method hereinbefore described, the reinforcing sleeve serves to prevent the end portion of the one article from shrinking away or collapsing when it is inserted in heated condition into the end portion of the other article.

Preferably, the reinforcing sleeve of the present invention is provided with an outwardly extending flange on the outer end thereof that engages the inner end of the end portion of the one article and is of substantially the same external size and shape in transverse cross-section as the one article. The flange serves to facilitate the positioning of the reinforcing sleeve within the end portion of the one article and also further prevents the deformation, flowing or collapsing of the end of the one article disposed within the end portion of the other article.

The reinforcing sleeve preferably is of a length that is at least equal to the length of overlap between the end portions of the articles to be joined, and the external size and shape of the sleeve in transverse cross section is substantially the same as that of the inner surface of the end portion of the one article in which it is disposed such that the reinforcing sleeve is slidable therein. Also, the reinforcing sleeve preferably has an inner diameter that is substantially the same as the inner diameter of the main portion of the other article.

DESCRIPTION OF THE PREFERRED EMBODIMENTS

Figure 1:
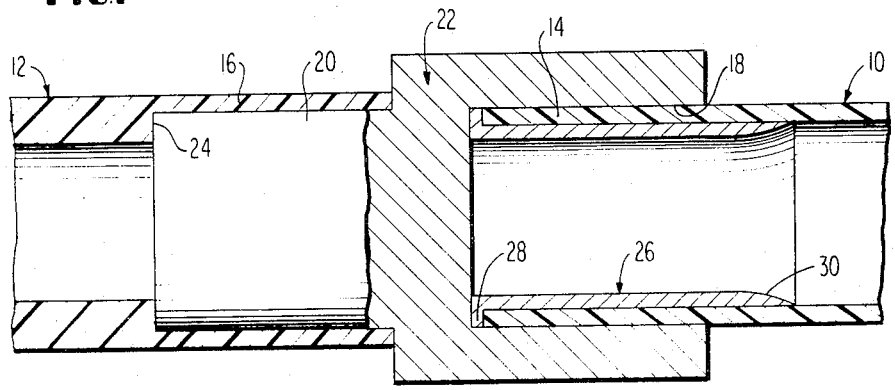
FIGS. 1 and 2 are side elevational views in section illustrating the steps for joining tubular articles of thermoplastic material in accordance with one embodiment of the method of the present invention.

As shown in FIG. 1, in accordance with a first embodiment of the method of the present invention, the end portions 14 and 16 of tubular articles 10 and 12 of thermoplastic material to be joined are disposed within a complementary cavity 18 and on an extension 20, respectively, of a heating tool 22. The heating tool 22 may be of any suitable or conventional construction, and may be heated in any suitable or conventional manner such as by electrical resistance heating. Also, the heating tool 22 may be formed of any suitable material which has a melting point that is higher than the melting point of the thermoplastic material of the tubular articles 10 and 12.

The end portion 14 of the tubular article 10 has an outer diameter that is substantially the same as the inner diameter of the end portion 16 of the tubular article 12, thereby enabling the end portion 14 to be slidably disposed within the end portion 16 to form a lap joint between the tubular articles 10 and 12. The tubular article 12 is provided with an inwardly extending annular stop surface 24 adjacent the end portion 16 thereof for limiting the depth to which the end portion 14 of article 10 may be inserted within the end portion 16 of article 12.

Prior to the insertion of the end portion 14 of tubular article 10 within the complementary cavity 18 of heating tool 22, a reinforcing sleeve 26 is slidably positioned within the end portion 14. The reinforcing sleeve 26 preferably has an outer diameter that is substantially the same as the inner diameter of the end portion 14 of tubular article 10, and the reinforcing sleeve 26 is formed of any suitable material having a melting point that is higher than the melting point of the thermoplastic material of the tubular articles 10 and 12. The sleeve, for example, can be made of a metal, such as aluminum, brass, or stainless steel, or of rigid plastic such as a thermosetting plastic or a high melting point thermoplastic polymer, all of which are well known in the art. At its outer end, the reinforcing sleeve 26 is provided with an outwardly extending annular flange 28 that has an outer diameter that is substantially the same as that of the end portion 14. At its inner end, the reinforcing sleeve 26 is formed with an axially inwardly and radially outwardly tapered portion 30 for the purpose of providing a smooth transition from the inner end of the reinforcing sleeve 26 to the adjacent inner surface of the tubular article 10. The tapered portion 30 of the reinforcing sleeve 26 serves to prevent the trapping or accumulation of any solids that may be present in the fluid that is to be conveyed through the tubular articles 10 and 12 after they have been joined. Alternatively, the inner surface of the reinforcing sleeve 26 might be gradually tapered from its outer end to its inner end, or the inner end thereof might not be tapered at all.

Figure 2:
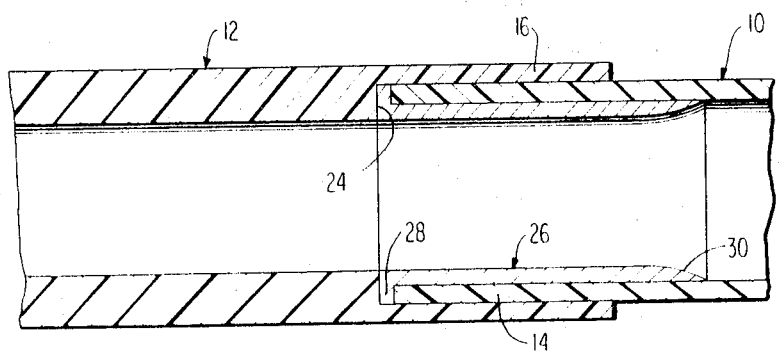

When the end portions 14 and 16 of the tubular articles 10 and 12 are positioned within the cavity 18 and on the extension 20, respectively, of the heating tool 22, the heating tool is heated to a temperature that exceeds the melting point of the thermoplastic material of the tubular articles 10 and 12. In this manner, after a predetermined time period, the outer surface of the end portion 14 and the inner surface of the end portion 16 are melted to a sufficient extent to permit fusion bonding thereof. Thereafter, the end portion 14 of tubular article 10 is removed from the cavity 18, and the end portion 16 in tubular article 12 is removed from the extension 20 of the heating tool 22. The heated end portions 14 and 16 are then disposed in overlapping relation in the manner shown in FIG. 2 to form a lap joint between the tubular articles 10 and 12.

The reinforcing sleeve 26 prevents the collapsing of the heated end portion 14 of the tubular article 10 when it is inserted within the end portion 16 of the tubular article 12. The reinforcing sleeve 26 further serves to prevent the shrinking away of the thermoplastic material of the end portion 14 upon subsequent cooling. Owing to the reinforcing sleeve 26, the overlapped melted surfaces of the end portions 14 and 16 are maintained in intimate contact to insure the formation of a continuous and strong fusion weld therebetween, thereby providing a strong leak-proof lap joint between the tubular articles 10 and 12. The annular flange 28 on the outer end of the reinforcing sleeve 26 serves to prevent the reinforcing sleeve 26 from shifting inwardly within the tubular end portion 14 beyond the inner end thereof, and also serves to protect the inner end of the tubular end portion 14 when it is inserted with the tubular end portion 16 after the end portions have been heated. The flange 28 engages the annular stop surface 24 within the tubular article 12 to limit the insertion of the end portion 14 within the end portion 16.

Figure 3:
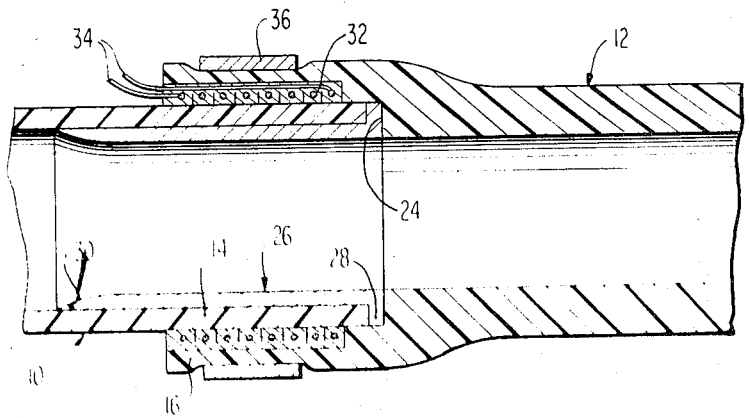
FIG. 3 is a side elevational view of a lap joint between tubular articles of thermoplastic material formed in accordance with a second embodiment of the method of the present invention.

Referring now to FIG. 3, a modified method is disclosed for forming a fusion-welded lap joint between the tubular articles 10 and 12 formed of thermoplastic material. In this modified method, the reinforcing sleeve 26 is positioned within the end portion 14 of tubular article 10, and the end portion 14 is thereafter positioned within the end portion 16 of tubular article 12 prior to the heating of these end portions. The overlapped end portions 14 and 16 are thereafter heated in any suitable or conventional manner to a temperature above the melting point of the thermoplastic material of the tubular articles 10 and 12 to melt the overlapped surfaces of the end portions 14 and 16 and to effect a fusion weld therebetween. The reinforcing sleeve 26 serves to prevent the end portion 14 from shrinking away from the end portion 16 as its thermoplastic material cools after heating, thereby maintaining the overlapped surfaces of the end portions 14 and 16 in intimate contact to insure a good fusion weld therebetween.

As an illustrative example, the overlapped end portions 14 and 16 may be heated by a welding sleeve 32 positioned therebetween which comprises a wire core embedded in a layer of thermoplastic material and having a pair of exposed leads 34 for connection to a source of electrical power. Upon the supply of electrical power to the wire core, it is heated electrically and melts the thermoplastic material of the sleeve 32 and also the adjacent surfaces of the overlapped end portions 14 and 16 to effect a thermal weld therebetween.

External pressure may be applied to the overlapped end portions 14 and 16 to maintain them in intimate contact during and after the heating thereof by utilizing a suitable type of clamping means 36 surrounding the end portion 16. The clamping means 36 serves to maintain the end portions 14 and 16 in intimate contact during the heating and subsequent curing thereof to insure a good fusion weld therebetween. The reinforcing sleeve 26 serves to prevent the collapse of the heated end portions 14 and 16 when external pressure is applied by the clamping means 36.

What is claimed is:

1. A method of forming a lap joint between two tubular articles of thermoplastic material, comprising the steps of:

positioning a reinforcing sleeve within the end portion of one of the articles that is to be disposed within a complementary end portion of the other of the articles, said reinforcing sleeve being formed of a material that has a melting point that is substantially higher than that of the thermoplastic material of each of the articles, and having an outwardly extending flange on the outer end thereof that covers the inner end of the one article and is of substantially the same external size and shape in transverse cross section as the one article, heating said end portions of the articles to be overlapped to melt the outer surface of the end portion of the one article and the inner surface of the end portion of the other article, and then inserting the heated end portion of the one article within the heated end portion of the other article until the flange of the sleeve engages a stop surface within the end portion of the other article to fusion weld said melted surfaces and to form a lap joint between said articles, whereby said reinforcing sleeve serves to prevent the end portion of the one article from deforming when it is heated and inserted into the end portion of the other article so as to maintain intimate contact therebetween during the fusion welding thereof.

2. The method of claim 1 wherein said sleeve is of a length that is at least substantially equal to the length of overlap between the articles.

3. The method of claim 1 wherein said sleeve is of substantially the same internal size and shape in transverse cross section as the other article.

4. The method of claim 1 wherein the inner surface of said sleeve is tapered outwardly toward the inner end thereof.

References Cited

UNITED STATES PATENTS

| | | | |
|---|---|---|---|
| 2,028,316 | 1/1936 | Brunner | 285—256 |
| 2,477,193 | 7/1949 | Melsom | 285—256 |
| 2,795,041 | 6/1957 | Klinksiek et al. | 285—256 |
| 2,963,394 | 12/1960 | Wilkinson | 285—21 |
| 2,142,150 | 1/1939 | Replogle | 156—583 |
| 3,022,209 | 2/1962 | Campbell | 156—158 |
| 3,378,672 | 4/1968 | Blumenkranz | 156—275 |

FOREIGN PATENTS

| | | | |
|---|---|---|---|
| 1,185,682 | 2/1956 | France | 156—293 |

DOUGLAS J. DRUMMOND, Primary Examiner

U.S. Cl. X.R.

156—275, 322